United States Patent [19]

Ciliberti

[11] 3,970,477

[45] July 20, 1976

[54] MERCURY TRAP AND CONTACT

[75] Inventor: Frank Ciliberti, Ossining, N.Y.

[73] Assignee: P. R. Mallory & Co., Inc., Indianapolis, Ind.

[22] Filed: Dec. 7, 1971

[21] Appl. No.: 205,582

[52] U.S. Cl. ............................................ 136/107
[51] Int. Cl.² ........................................ H01M 6/06
[58] Field of Search .............. 136/107, 102, 30, 31, 136/24, 26, 20

[56] References Cited
UNITED STATES PATENTS

| 3,096,217 | 7/1963 | Clune | 136/107 |
|---|---|---|---|
| 3,335,031 | 8/1967 | Kordesch | 136/107 |
| 3,438,812 | 4/1969 | Cherney et al. | 136/24 |
| 3,510,358 | 5/1970 | Nabiullin et al. | 136/107 |
| 3,530,496 | 9/1970 | Amano et al. | 136/30 |
| 3,663,298 | 5/1972 | McCoy et al. | 136/31 |
| 3,672,998 | 6/1972 | Darland, Jr. | 136/30 |
| 3,673,000 | 6/1972 | Ruetschi | 136/107 |

Primary Examiner—John H. Mack
Assistant Examiner—C. F. LeFevour
Attorney, Agent, or Firm—Ronald S. Cornell; Israel Nissenbaum; Charles W. Hoffman

[57] ABSTRACT

An electrochemical cell is provided with means for isolating and segregating the mercury droplets formed during the electrochemical consumption of amalgamated anodic materials. The segregating means comprises amalgamable metal sheet, preferably of expanded surface area as provided by grids of screening or expanded metal lath, in contact and adjacent to the inactive face of the anode. While zinc is the exemplified anode, the grid will protect other amalgamated anodes including cadmium and lead in aqueous systems, and lithium, sodium and calcium in non-aqueous systems.

2 Claims, 3 Drawing Figures

U.S. Patent  July 20, 1976  3,970,477
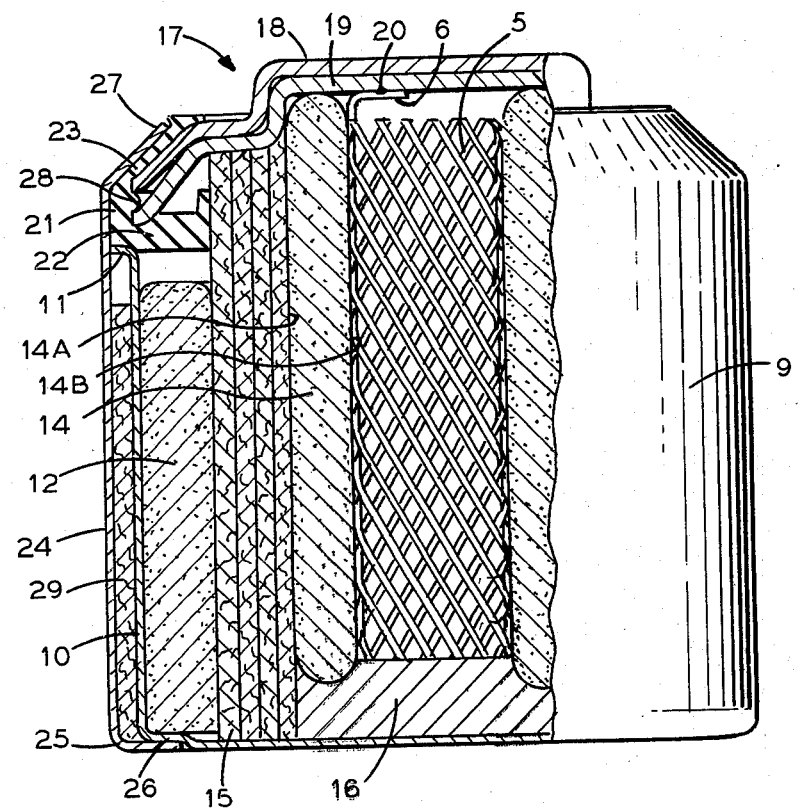
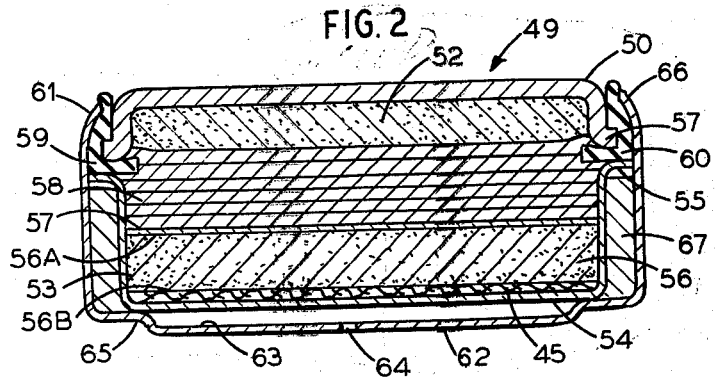
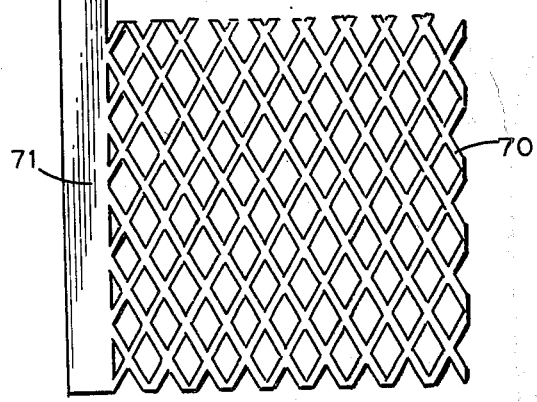

MERCURY TRAP AND CONTACT

FIELD OF THE INVENTION

This invention relates to electrochemical cells and more particularly to electrochemical cells with amalgamated anodes.

PRIOR ART

It has long been known that it is useful to amalgamate the anodes of alkaline cells having cathodic depolarizers of mercury, silver or manganese oxides. Amalgamation of such anodes particularly zinc anodes, reduces the local action within the cell, reduces the reactivity of the zinc with the electrolyte and reduces and controls the evolution of hydrogen within cells utilizing zinc anodes.

U.S. Pat. Nos. 2,526,692; 2,527,567 and 2,542,710 to Ruben describe the amalgamation of anodes in primary cells. U.S. Pat. Nos. 2,610,219 and 2,712,565 describe the use of amalgamated zinc in secondary or rechargable cells. It is also known to add small amounts of mercury to cadmium anodes of rechargeable nickel/cadmium cells.

BACKGROUND OF THE INVENTION

As cells containing amalgamated anodes are discharged droplets of free mercury are formed. These droplets accumulate within the cell. Since mercury is characteristically liquid the metallic droplets coalesce to larger drops which tend to accumulate in any voids within the cell, and tend to displace the electrolyte from between the electrodes and eventually to cause short-circuits between the cathodes and the anodes. Since it is common practice to amalgamate the zinc anodes for alkaline cells with up to about 13% of mercury, appreciable amounts of mercury are available for such accumulation and consequent short-circuiting. In low drain cells used for instrumentation control, pacemakers and horological equipment, this free mercury from the anodes has been found to contribute to failures resulting from internal shorts. It was observed that enough mercury was present to internally short such cells when about 60% of the cell capacity (based on zinc) had been utilized. At 80% of capacity the mercury freed from the amalgamated anode was a major cause of cell failure.

THE INVENTION

It is an object of the invention to provide means for the segregation and immobilization of the free mercury as it is liberated from the amalgamated anode as the active anodic metal of the anode is electrochemically utilized.

It is a further object of this invention to provide a trap for holding the mercury droplets at regions of the cell away from the electrolyte or the active faces of the anode.

It is another object of this invention to prevent the shorting of the cell by the accumulated mercury collecting in the space between the anode and the cathode.

These and other objects of this invention are achieved by providing a metallic grid of amalgamable metal for trapping the mercury droplets. These grids are at least coextensive with the inactive surface of anode i.e. the surface not juxtaposed to the cathode.

DETAILED DESCRIPTION OF THE INVENTION

The invention will be more fully described with reference to the drawing where:

FIG. 1 is a partial sectional side elevation of a cell according to this invention having a cylindrical structure.

FIG. 2 is a sectional side elevation of a "button" cell embodiment of this invention having a flat pellet structure.

FIG. 3 is a detail of the expanded metal lath grid structure as is used in cylindrical cells and showing same in its pre-tubular configuration.

Referring more particularly to the embodiment of the invention of FIG. 1, there is shown therein a cylindrical cell 9 of the usual configuration but with the metal grid 5 of this invention in contact with the amalgamated anode 14. Cylindrical cell 9 includes an inner casing 10 or can of steel having a cylindrical shape and an outwardly extending flange 11 at its open end, a cathode body 12, preferably of the chemical depolarizer type, such as a mixture of mercuric oxide with a small portion of graphite or manganese dioxide with graphite, is provided in the form of a cylindrical sleeve. Cathode body 12 is pressure fit and in electrical contact with the inner surface of can 10.

An anode 14, in the form of a cylindrical sleeve, pressed from an amalgamated anodic metal such as amalgamated zinc powder, is provided in can 10 and is concentrically spaced from cathode 12. A plurality of layers 15, of absorbent spacer material, such as alkali-resistant bibulous paper, are interposed between cathode 12 and anode 14. These spacer layers are saturated with the electrolyte, which is preferably a concentrated solution of alkali hydroxide and may have dissolved therein suitable amounts of oxidized ions of anodic material, for example, zincate ions.

Anode 14, a hollow cylinder, is provided with an active face 14A in contact with the electrolyte in spacer 15 and a collector face 14B on its inner surface. In contact with the collector face 14B is grid 5 of an amalgamable metal or alloy such as brass, bronze, silver etc. The grid 5 may be formed of an expanded metal lath or of metal screening or even of sheet metal with or without perforation. Expedients for extending the surface area of the grid are preferred. The metal for the grid should be amalgamable and wettable by mercury. Grid 5 is preferably provided with a solid metal tab 6 for purposes of providing an electrical connection or conductive pathway to the anodic cell terminal assembly.

An insulating spacer 16 of an insulative and elastic material is provided at the bottom of can 10 and serves to prevent electrical contact between the anode 14 and can 10 which serves as the cathodic terminal of the cell.

The top closure anode terminal assembly 17 of the cell comprises a pair of dished metal plates 18 and 19 which have their center portions dished so that inner disc 19 will be nested by tight friction fit with outer disc 18 to provide good electrical contact. Tab 6 of grid 5 may be welded to inner disc 19 to insure good electrical contact of the anode 14 with terminal 17. Preferably tab 6 and terminal assembly 17 consisting of discs 18 and 19 are all spot welded together at weld 20 to form a unitary joint, to exclude relative displacement and to insure good electrical connection of the anode 14 to its terminal 17.

The outer edges of discs 18 and 19 are slightly separated to form an acute angle therebetween. An insulating and sealing collar 21 of polymeric material such as polyethylene, insulates terminal assembly 17 from can 10 and also provides a gas tight enclosure therewith. Sealing collar 21 comprises a body portion 22 which extends between flange 11 of can 10 and the circumferential edge of inner disc 19. The sleeve portion 23 of sealing collar 21 extends along the surface of outer disc 18.

An outer can or jacket 24 encircles the inner can 10. At one end, jacket 24 is bent inwardly at region 25 and rests on annular ledge 26 of can 10. Jacket 24, at its other end 27, is crimped inwardly to apply axial compression on body portion 22 of sealing collar 21 and to simultaneously apply radial pressure upon sleeve portion 23 of collar 21. These compression forces force a part 28 of sleeve 23 into the angular space formed between the edges of discs 18 and 19.

This seal provides insulation of terminal 17 from jacket 24 and effectively provides a secure gas and liquid tight seal for the cell 19. The space between can 10 and jacket 24 may be filled with an absorbent 29 to immobilize any exuded electrolyte.

In operation, during discharge, any free mercury, liberated from the anode metal when it is converted to its oxide by the electrochemical action of the cell, is captured at the metal grid 5 of the cell, first by its proclivity for wetting amalgamable metals and then the free mercury is finally immobilized by amalgamating itself with the grid metal. By providing the collector grid 5 in perforated or expanded form a maximum of surface is provided for wetting and amalgamation.

In cells where the anode material is provided in large amounts or where due to the type of service the anode is heavily amalgamated, a substantial portion of the tubular hollow space within the cylindrical anode may be filled with a rolled up helix of grid 5 of amalgamable metal.

It is to be understood that the relative positioning of the anodes and cathodes shown in FIG. 1 in the conventional mode but may be interchanged i.e. the anode may encircle the cathode in cylindrical cells or the grid and anode may overlay the cathode in button cells.

FIG. 2 shows the detailed structure of the expanded metal lath 70 which is the preferred grid material. The embodiment shown is particularly suitable for use in the cylindrical cells shown in FIG. 1 as the grid material, here shown in its pre-tubular form, is provided with a solid metal portion 71 adjoining and attached to lath 70 and extending therefrom to provide a tab 72 suitable for connecting to terminals by welding or other fastening methods which provide good electrical conductive pathways.

It will be understood that the various embodiments shown and materials mentioned are merely illustrative of the invention and the invention should not be construed as being limited thereby. All art recognized equivalents of such materials and the physical embodiments of this invention are intended to lie within the scope of the specifically illustrated modes.

I claim:

1. An electrochemical cell comprising positive and negative terminal means connected respectively to a cathode and an amalgamated anode wherein said amalgamated anode comprises a hollow cylinder of amalgamated metal, with an alkaline electrolyte disposed therebetween, wherein said anode is provided with an active surface which comprises the outer surface of said cylinder and which is juxtaposed to said cathode and a collector surface on the opposite side of said anode from said active surface which is the inner surface of said cylinder, means for isolating and segrating mercury droplets formed during the electrochemical consumption of said amalgamated anode, said means comprising a grid of amalgamable metal substantially coextensive with and in electrical conductive contact with the inner surface of said cylinder.

2. The cell according to claim 1 wherein said metallic grid forms a helix substantially filling the hollow void within said cylindrical anode.

* * * * *